(12) United States Patent
Ersoy et al.

(10) Patent No.: US 7,121,559 B2
(45) Date of Patent: Oct. 17, 2006

(54) STABILISER BAR FOR A MOTOR VEHICLE

(75) Inventors: Metin Ersoy, Walluf (DE); Jens Vortmeyer, Preussisch Oldendorf (DE)

(73) Assignee: ZF Lemforder Metallwaren AG(DE)

( * ) Notice: Subject to any disclaimer, the term of this patent is extended or adjusted under 35 U.S.C. 154(b) by 286 days.

(21) Appl. No.: 10/480,395

(22) PCT Filed: Feb. 11, 2003

(86) PCT No.: PCT/DE03/00391

§ 371 (c)(1),
(2), (4) Date: Dec. 8, 2003

(87) PCT Pub. No.: WO03/068541

PCT Pub. Date: Aug. 21, 2003

(65) Prior Publication Data

US 2004/0169346 A1  Sep. 2, 2004

(30) Foreign Application Priority Data

Feb. 12, 2002 (DE) .................... 102 05 932

(51) Int. Cl.
*B60G 21/055* (2006.01)
(52) U.S. Cl. .................... 280/5.511; 280/124.107; 267/188
(58) Field of Classification Search ............ 280/5.506, 280/5.511, 124.106, 124.107, 124.149, 124.152, 280/124.166, 124.137; 267/188, 273, 277
See application file for complete search history.

(56) References Cited

U.S. PATENT DOCUMENTS

| 3,197,233 A | | 7/1965 | Van Winsen et al. | |
|---|---|---|---|---|
| 4,648,620 A | * | 3/1987 | Nuss | 280/5.511 |
| 4,919,444 A | | 4/1990 | Leiber et al. | |
| 4,962,943 A | * | 10/1990 | Lin | 280/5.511 |
| 6,022,030 A | | 2/2000 | Fehring | |
| 6,428,019 B1 | * | 8/2002 | Kincad et al. | 280/5.511 |
| 6,439,583 B1 | | 8/2002 | Markowetz | |
| 6,513,819 B1 | * | 2/2003 | Oliver et al. | 280/124.152 |
| 6,637,757 B1 | * | 10/2003 | Ignatius et al. | 280/5.511 |
| 6,698,767 B1 | * | 3/2004 | Hagan | 280/5.511 |
| 6,805,361 B1 | * | 10/2004 | Germano et al. | 280/5.511 |
| 6,811,166 B1 | * | 11/2004 | Carlstedt et al. | 280/124.152 |

FOREIGN PATENT DOCUMENTS

| DE | 649 020 | 10/1934 |
|---|---|---|
| DE | 1 105 290 | 4/1961 |
| DE | 37 40 244 C2 | 6/1989 |

(Continued)

*Primary Examiner*—David R. Dunn
*Assistant Examiner*—Drew J. Brown
(74) *Attorney, Agent, or Firm*—McGlew & Tuttle, PC

(57) ABSTRACT

A roll bar (1') for a motor vehicle is proposed according to the present invention, with an unsplit torsion bar (5'), which is rotatably fastened to a vehicle chassis (3), is connected to two opposite wheel suspensions (4') of the said axle of the vehicle, and has a torsion area for the elastic coupling of spring action movements of the opposite wheel suspensions (4'), wherein the roll bar (1') has, furthermore, a first torsion tube (8'), which surrounds the unsplit torsion bar (5') at least in a first partial area (B') of its torsion area, and whose first end (8a') is connected to the unsplit torsion bar (5'), rotating in unison therewith, and whose second end (8b') can be connected to the unsplit torsion bar (5') by means of a clutch arrangement (9') in such a way that it selectively rotates in unison therewith, so that the torsional stiffness of the roll bar (1') can be varied.

21 Claims, 5 Drawing Sheets

FOREIGN PATENT DOCUMENTS

| | | |
|---|---|---|
| DE | 43 07 639 C1 | 10/1994 |
| DE | 199 50 624 A1 | 4/2001 |
| EP | 0 202 842 | 11/1986 |
| EP | 1 093 942 A1 | 4/2001 |
| JP | 61166715 | 7/1986 |
| JP | 63057309 | 3/1988 |
| JP | 03227713 | 10/1991 |
| JP | 08268029 | 10/1996 |
| JP | 2000289427 | 10/2000 |
| JP | 2001047838 A | 2/2001 |

\* cited by examiner

STABILISER BAR FOR A MOTOR VEHICLE

FIELD OF THE INVENTION

The present invention pertains to a motor vehicle roll bar having a unsplit torsion bar, which is rotatably fastened to a vehicle chassis, is connected to two opposite wheel suspensions of the same axle of the vehicle and has a torsion area for elastically coupling spring action movements of the opposite wheel suspensions.

BACKGROUND OF THE INVENTION

Roll bars for motor vehicles are usually used to elastically couple the wheel suspension of a wheel on one side of the motor vehicle with the wheel suspension of the corresponding wheel of the same axle on the other side of the motor vehicle. The coupling is performed such that when one wheel is deflected inwardly, the spring action of the other wheel is also acted on in the direction of inward deflection. As a result, the lateral slope of the motor vehicle toward the outside of the curve is reduced during the travel of the motor vehicle in a curve, partly because the wheel suspension of the particular wheel that is the outer wheel in the curve is additionally supported by the spring system of the wheel suspension of the wheel that is the inner wheel in the curve and partly because the wheel suspension of the wheel that is the inner wheel in the curve is forced somewhat in the direction of inward deflection relative to the chassis of the vehicle.

By contrast, the roll bar shall not possibly affect the spring action characteristics of the vehicle during straight-line travel.

However, if the pavement is so uneven that one wheel on one side of the vehicle is forced in the inward deflection direction, while the corresponding wheel on the other side of the vehicle must be moved in the outward deflection direction to maintain the desired road contact, the driving smoothness is compromised by a roll bar, because the roll bar tends to counteract mutually opposite movements of the wheel suspensions coupled by the roll bar relative to the vehicle body. Thus, during straight-line travel, a roll bar may undesirably cause vibrations of one wheel to be transmitted to the opposite wheel of the same axle, which compromises the driving smoothness.

This contradiction between the safety and comfort requirements imposed on a roll bar can be eliminated if the roll bar is switched off during straight-line travel and is again switched on automatically during travel in a curve.

Such a system has been known from, e.g., DE-AS 11 05 290. It is described in DE-AS 11 05 290 that a stabilizer with split torsion bar is provided, the sections being connected to one another in the manner of a hydraulic clutch, which are controlled as a function of the centrifugal force or the steering of the vehicle. Thus, it is possible to inactivate the stabilizer during straight-line travel by releasing the clutch and to switch it on during travel in a curve. It is also known from this document that the sections of the torsion bar can be adjusted in relation to one another during travel in a curve by means of a motor operator such that the vehicle body slopes less far toward the outside of the curve, i.e., a sloping is actively counteracted.

A prior-art actuator for coupling roll bars with split torsion bar is known from DE 199 50 244 C2. Other actuators are described in DE 37 40 24 C2.

The drawback of the prior-art roll bars with torsion bar is that the switching on (coupling) of the roll bar during travel in a curve must take place, in general, automatically and very rapidly for safety reasons, because the vehicle could otherwise become uncontrollable in the curve. The high costs of the prior-art roll bars which are associated with these requirements on the actuator have caused that switch-on roll bars (also known under the name "active roll bars") are not used in models manufactured in large series (i.e., in vehicles manufactured in large numbers).

Furthermore, slow, manually switchable roll bars are known, which are used especially in off-the-road vehicles. However, such roll bars, known, e.g., from DE 43 07 639 C1, are suitable only for improving the traction during slow travel on the terrain. Such systems are not suitable for safety reasons for switching on and off the roll bar during travel on a normal road, because there is a risk that the roll bar will not be switched on or will not be switched on in time in a curve, and the vehicle will thus assume an uncontrollable state.

SUMMARY OF THE INVENTION

The object of the present invention is to provide an inexpensive roll bar which is always sufficiently effective during travel in a curve as well as in evading maneuvers and also affects the spring action characteristics of the vehicle only slightly in order to guarantee a high level of driving smoothness.

According to the present invention, a roll bar for a motor vehicle is provided, which has an unsplit torsion bar, which is fastened rotatably to a vehicle chassis, is connected to two opposite wheel suspensions of the same axle of the vehicle and has a torsion area for the elastic coupling of spring action movements of the opposite wheel suspensions, wherein the roll bar has, furthermore, a first torsion tube, which surrounds the unsplit torsion bar in at least one first partial area of its torsion area and whose first end is connected to the unsplit torsion bar, rotating in unison, and whose second end can be connected to the unsplit torsion bar by means of a clutch arrangement, selectively rotating in unison, so that the torsional stiffness of the roll bar can be varied.

Thus, the spring action movements of the opposite wheel suspensions are not fully uncoupled according to the present invention, but only the torsional stiffness of the clutch arrangement is changed. Therefore, it is also not necessary to design the clutch arrangement to the maximum torsional stiffness of the roll bar, but only to the torsional stiffness of the torsion tube, as a result of which the clutch arrangement can have a simpler design and can consequently be manufactured at a lower cost. A minimum of elastic coupling of the spring action movements of the opposite wheel suspensions is always guaranteed in the roll bar according to the present invention even in case of complete failure of the clutch arrangement.

In a preferred embodiment, the unsplit torsion bar has areas of different torsional stiffness, and the torsional stiffness of the unsplit torsion bar is smaller in a first partial area than in a second partial area.

It is possible as a result to arrange the clutch arrangement of the roll bar according to the present invention specifically at a favorable installation site on the motor vehicle.

The torsional stiffness of the unsplit torsion bar is preferably between 20% and 50%, and the torsional stiffness of the torsion tube is between 80% and 50% of the torsional stiffness of the roll bar when the second end of the torsion tube is connected to the unsplit torsion bar by means of the clutch arrangement in such a way that they rotate in unison.

To accomplish the above-described object of the roll bar according to the present invention as reliably as possible, the clutch arrangement is preferably suitable for connecting the second end of the first torsion tube to the torsion bar, rotating in unison, depending on the actual and/or expectable lateral acceleration of the vehicle. It is thus possible to automatically uncouple the roll bar during the straight-line travel of the vehicle and to automatically couple it again during travel in a curve.

According to an alternative embodiment, the roll bar according to the present invention has, furthermore, a second torsion tube, which surrounds the torsion bar in a second partial area of its torsion area and whose first end can be connected to the second end of the first torsion tube by means of the clutch arrangement, selectively rotating in unison, and whose second end is connected to the unsplit torsion bar, rotating in unison.

In such an embodiment of the roll bar according to the present invention, the first torsion tube is coupled with the second torsion tube rather than being directly coupled with the unsplit torsion bar. This allows, in particular, more freedom in arranging the clutch arrangement on the motor vehicle.

It is especially advantageous in an alternative embodiment of the roll bar according to the present invention for the torsional stiffness of the torsion tubes connected for rotation in unison to be between 80% and 50% of the torsional stiffness of the roll bar when the second end of the first torsion tube is connected to the first end of the second torsion tube by means of the clutch arrangement in such a way that it rotates in unison with it.

It is also advantageous in the alternative embodiment for the clutch arrangement to be suitable for connecting the second end of the first torsion tube to the first end of the second torsion tube in such a way that they rotate in unison as a function of the actual and/or expectable lateral acceleration of the vehicle. It is thus possible to automatically uncouple the roll bar during the straight-line travel of the vehicle and to automatically couple it again during travel in a curve.

A clutch arrangement of a roll bar can be embodied according to the alternative embodiment in an especially simple form if the first end of the first torsion tube and/or the second end of the second torsion tube are mounted at the torsion bar, rotating in unison, such that it is axially displaceable by the clutch arrangement.

To prevent the undesired twisting of the torsion bar and/or the torsion tubes, it is advantageous for the first and/or second torsion tube to centrically surround the unsplit torsion bar.

The clutch arrangement can be preferably controlled as a function of the velocity of the vehicle and the steering angle and/or the angular velocity of the steering wheel and/or the lateral acceleration of the vehicle.

According to a preferred embodiment, the clutch arrangement has spring assemblies, which are designed such that rapid closing of the clutch arrangement is guaranteed. Thus, it is not necessary to supply energy to close the clutch arrangement, as a result of which the system has a high level of error tolerance.

To rule out a safety hazard during a possible malfunction, the clutch arrangement is preferably designed such that it closes or remains closed automatically in case of a defect.

In general, the clutch arrangement may be switched, e.g., hydraulically or pneumatically.

According to a preferred embodiment, the clutch arrangement has a circular hydraulic cylinder, which is suitable for opening the clutch arrangement.

To guarantee reliable coupling even under difficult conditions (e.g., twisted torsion bar during straight-line travel as a consequence of potholes), the clutch arrangement is preferably designed such that a crossing between the torsion bar and the torsion tube or between the two torsion tubes that is permissible during the straight-line travel of the vehicle cannot be exceeded.

The permissible crossing between the torsion bar and the torsion tube or between the two torsion tubes can be limited in an especially simple manner by means of end stops.

According to a preferred embodiment, the clutch arrangement is designed in the form of a claw clutch.

The claw teeth of the claw clutch are preferably designed in this case such that a crossing that is permissible between the torsion bar and the torsion tube or between the two torsion tubes during the straight-line travel of the vehicle cannot be exceeded when the coupling is opened.

It is especially advantageous, furthermore, for the claw teeth of the clutch arrangement to be designed such that the spring force of a spring, which is suitable for closing the claw clutch, is amplified via the flanks of the teeth in order to guarantee the reliable closing of the claw clutch even in case of a crossing between the torsion bar and the torsion tube or between the two torsion tubes.

According to an alternative preferred embodiment, the clutch arrangement is designed in the form of a carrier ball coupling, which has a first element and a second element, the elements being displaceable in relation to one another, and pockets for carrier balls being arranged in mutually facing sides of the elements, so that the carrier balls are arranged between the first element and the second element.

The pockets are preferably arranged on a circular ring here and have a shape corresponding to a segment of an ellipsoid of revolution.

To ensure that the carrier ball coupling can also be closed with certainty in case of a crossing between the torsion bar and the torsion tube or between the two torsion tubes, the pockets preferably have ramps, which are designed such that a permissible crossing between the torsion bar and the torsion tube or between the two torsion tubes cannot be exceeded with the carrier ball coupling opened.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
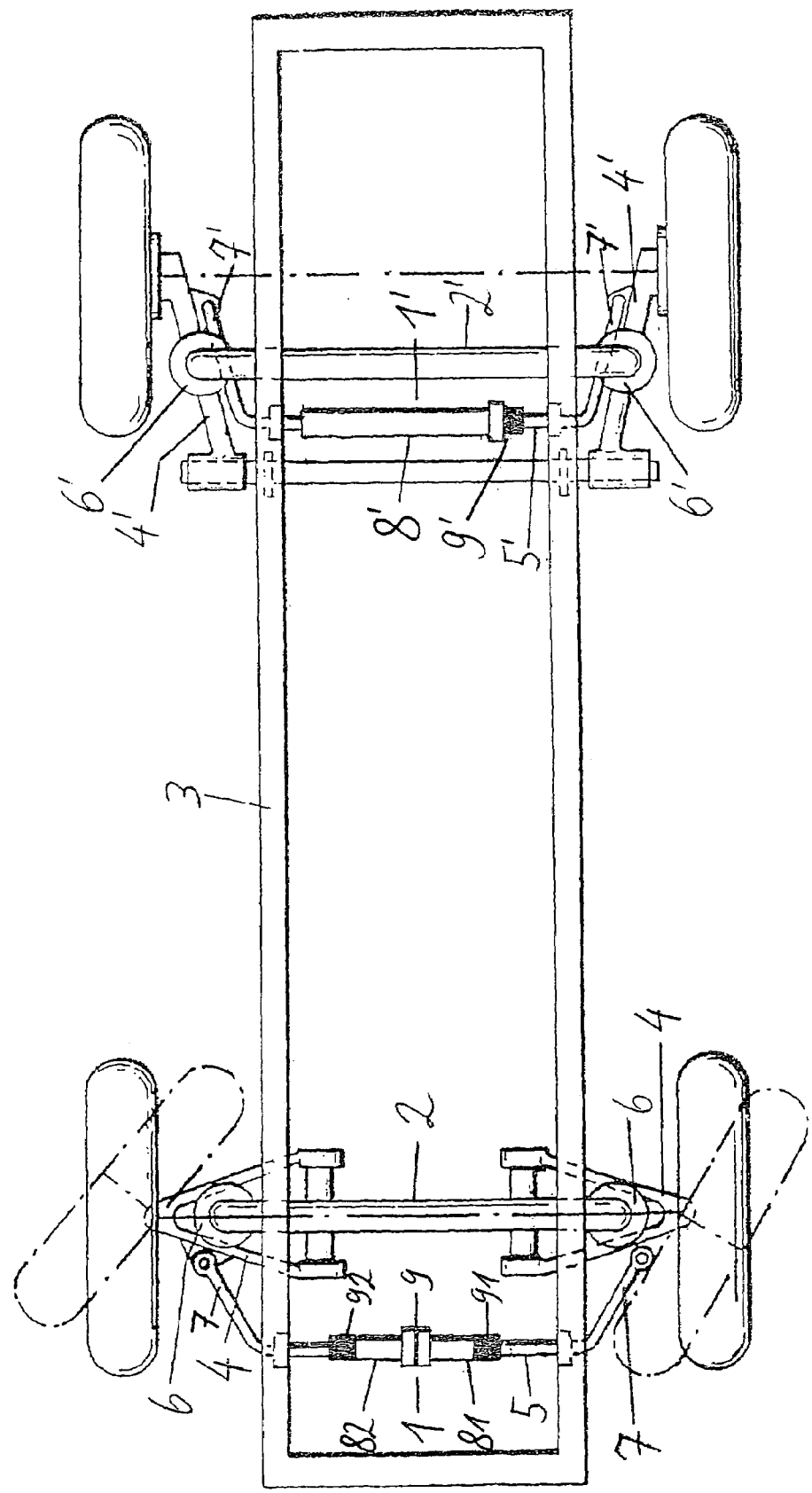
FIG. 1 is the schematic view showing a design of a motor vehicle chassis with roll bars according to the present invention.

Referring to the drawings in particular, identical elements are designated by identical reference numbers.

FIG. 1 shows how the roll bars 1, 1' according to the present invention can be arranged in a motor vehicle. In the exemplary embodiment being shown, two different embodiments of the roll bar 1, 1' according to the present invention are arranged on the front axle 2 and the rear axle 2' of the vehicle. However, it is, of course, also possible as an alternative without any problems and may even be meaningful to arrange the same embodiment of the roll bar according to the present invention on both the front axle and the rear axle, or to arrange the roll bar according to the present invention on only one axle and to arrange a conventional roll bar on the other axle.

The roll bar 1, 1' according to the present invention has an unsplit torsion bar 5, 5' each, which is rotatably fastened to a vehicle chassis and is connected to two opposite wheel suspensions 4, 4' of the same axle 2, 2' of the vehicle. The torsion bar 5, 5' has a torsion area for the elastic coupling of spring action movements of the wheel suspensions 4, 4' located opposite each other in pairs. The torsion area extends essentially between the two bent arms 7, 7' of the respective torsion bar 5, 5'.

The torsion bar 5, 5' is preferably mounted on or articulated to the vehicle chassis 3 and to the wheel suspensions 4, 4' such that it has to absorb only a small bending moment at most. The vehicle chassis 3 is usually sprung in relation to the wheel suspensions 4, 4' by means of springs 6, 6'.

Figure 2:
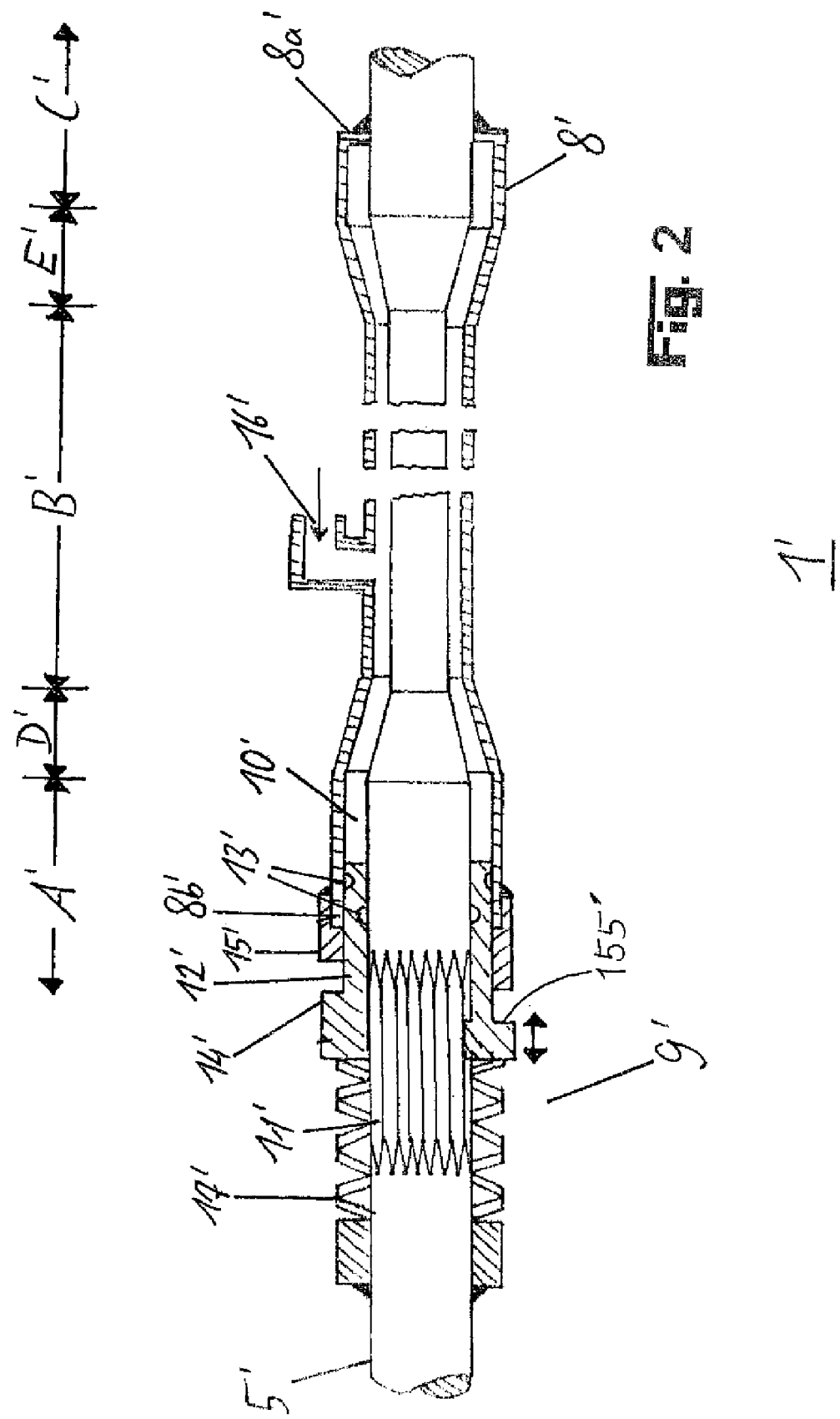
FIG. 2 is a cross-sectional view of the essential elements of the roll bar according to the present invention according to a first preferred embodiment.

According to the first preferred embodiment of the present invention shown in FIG. 2, a roll bar, designed as a whole by 1', has an unsplit torsion bar 5', which is arranged in the transverse direction of the vehicle and is mounted rotatably in mounts (not shown), which are a rigid part of the vehicle. Lever arms 7' (not shown in FIG. 2) are fastened to the ends of the unsplit torsion bar 5', which face away from each other. The free ends of the lever arms 7' are connected to the respective wheel suspension 4' (not shown in FIG. 2) of a wheel on the right-hand and left-hand sides of the vehicle each such that each lever arm 7' pivots around the axis of the unsplit torsion bar 5' during spring travel of the associated wheel. Two opposite wheel suspensions of the same axle 2' of the vehicle are thus coupled elastically via the torsion bar 5' having a torsion area.

The torsion bar 5' has three partial areas A', B', C' of different torsional stiffness, the torsion stiffness in the partial areas A' and C' being essentially equal in the embodiment being shown, and the torsional stiffness in the partial area B' being lower than in the partial areas A' and C'. The torsional stiffness is essentially constant within the individual areas A', B' and C'. There are small transition areas D' and E', in which the torsional stiffness of the torsion bar 5' is not constant, between the areas A' and B' as well as between the areas B' and C'. The individual areas are formed by a corresponding tapering of the torsion bar 5' in the embodiment being shown.

Furthermore, the roll bar 1' according to the present invention has a torsion tube 8', which centrically surrounds the unsplit torsion bar 5' essentially in the partial area B' and in the transition areas D' and E' of its torsion area, and whose first end 8a' is connected to the partial area C' of the unsplit torsion bar 5', e.g., by welding, soldering or screwing, rotating in unison therewith, and whose second end 8b' can be connected to the partial area A' of the unsplit torsion 5' by means of a clutch arrangement generally designated by 9', selectively rotating in unison therewith, so that the torsional stiffness of the roll bar 1' as a whole can be varied.

In the embodiment being shown in FIG. 2, the torsional stiffness of the unsplit torsion bar 5' and of the torsion tube 8' is selected by the suitable selection of the dimensions and the material of the torsion bar 5' and of the torsion tube 8'. With such selection the torsional stiffness of the torsion bar 5' is 30% and the torsional stiffness of the torsion tube 8' is 70% of the total torsional stiffness of the roll bar if the second end 8b' of the torsion tube 8' is connected to the partial area A of the unsplit torsion bar 5' by means of the clutch arrangement 9', rotating in unison therewith.

However, it is generally advantageous for the torsional stiffness of the torsion bar 5' to be between 20% and 50% and for the torsional stiffness of the torsion tube 8' to be between 80% and 50% of the torsional stiffness of the roll bar 1' if the second end 8b' of the torsion tube 8' is connected to the unsplit torsion bar 5' by means of the clutch arrangement 9', rotating in unison therewith.

The clutch arrangement 9' is suitable for connecting the second end 8b' of the torsion tube 8' to the partial area A' of the torsion bar 5', rotating in unison, as a function of the actual and/or expectable lateral acceleration of the vehicle to transmit a torque and for separating it from the partial area A' of the torsion bar 5' such that the partial area A' of the torsion bar 5' and the second end 8b' of the torsion tube 8' can rotate independently from each other.

The clutch arrangement 9 is designed for this purpose, as is shown in FIG. 2, as a claw clutch and has claw teeth (not specifically shown), which are designed such that a crossing of the partial area A' of the torsion bar 5' and the second end 8b' of the torsion tube 8', which is permissible during straight-line travel of the vehicle, cannot be exceeded. As an alternative, such a limitation of the crossing between the torsion bar and the torsion tube, which is permissible during the straight-line travel of the vehicle, may also be brought about by means of end stops 155'.

According to another embodiment, not shown, the claw teeth of the claw clutch are designed, furthermore, such that the spring force of a spring, which is suitable for closing the claw clutch, is amplified via the flanks of the teeth in order to guarantee the reliable closing of the claw clutch even in case of a crossing between the torsion bar and the torsion tube.

The claw clutch 9' shown in FIG. 2 has an annular chamber 10', which is formed essentially by the torsion tube 8' and the torsion bar 5' and is closed by an annular piston 12' displaceable in longitudinal grooves 11'. The longitudinal grooves 11' are prepared in the partial area A' of the torsion bar 5'. The annular piston 12' is thus arranged nonrotatably in relation to the torsion bar 5' but axially displaceably, and both rotatably and axially displaceably in relation to the second end 8b' of the torsion tube 8'. The annular piston 12' has seals 13' for sealing the annular chamber 10' against the inner wall of the torsion tube 8' and the outer wall of the torsion bar 5'.

Respective claws 14', 15', which can engage each other, are fastened to the displaceable annular piston 12' and the second end 8b' of the torsion tube 8', e.g., by welding.

The annular chamber 10' is connected via an inlet opening 16' to a pressure source in order to admit a pressurized hydraulic or pneumatic medium into the annular chamber 10'. The forces of pressure of the medium are selected to be such that they can move the annular piston 12' with the claws 14' arranged thereon away from the claws 15' arranged at the second end 8b' of the torsion tube 8', so that it is selectively possible to uncouple the partial section A' of the torsion bar 5' from the second end 8b of the torsion tube 8'. Usual ranges for the force of pressure are 120 to 170 bar and preferably 150 bar.

To create a system that guarantees the reliable and automatic closing of the clutch arrangement 9' or keeps the clutch arrangement 9' closed in case of a defect (e.g., in case of failure of a hydraulic pump controlling the clutch arrangement 9'), the annular piston 12' is pretensioned by springs 17' (preferably plate springs) in the closing direction of the clutch arrangement 9' and consequently in the direction of the annular chamber 10'.

Thus, the claws 14' arranged on the annular piston 12', rotating in unison therewith, will engage the claws 15' arranged at the second end 8b' of the torsion tube 8' in such a way that they rotate in unison in the absence of a corresponding back pressure of the medium in the annular chamber 10' because of the force of pressure of the springs 17', so that the claws 14' and 15' and consequently also the partial section A' of the torsion bar 5' and the second end 8b' of the torsion tube 8' of the roll bar are coupled with one another in a non-positive manner.

Consequently, the torsional stiffness of the roll bar 1' according to the present invention in the coupled state is obtained in this embodiment as the sum of the torsional stiffnesses of the torsion bar 5' and the torsion tube 8'.

When a corresponding force of pressure of the medium appears in the annular chamber 10', the non-positive connection is interrupted, so that the torsional stiffness of the roll bar 1' according to the present invention in the uncoupled state is obtained only as the torsional stiffness of the torsion bar 5'.

Instead of the annular chamber 10' as well as the annular piston 12', it is also possible to arrange a plurality of chambers with circular cross sections or the like for a corresponding plurality of individual pistons, which are actuated simultaneously.

Figure 3:
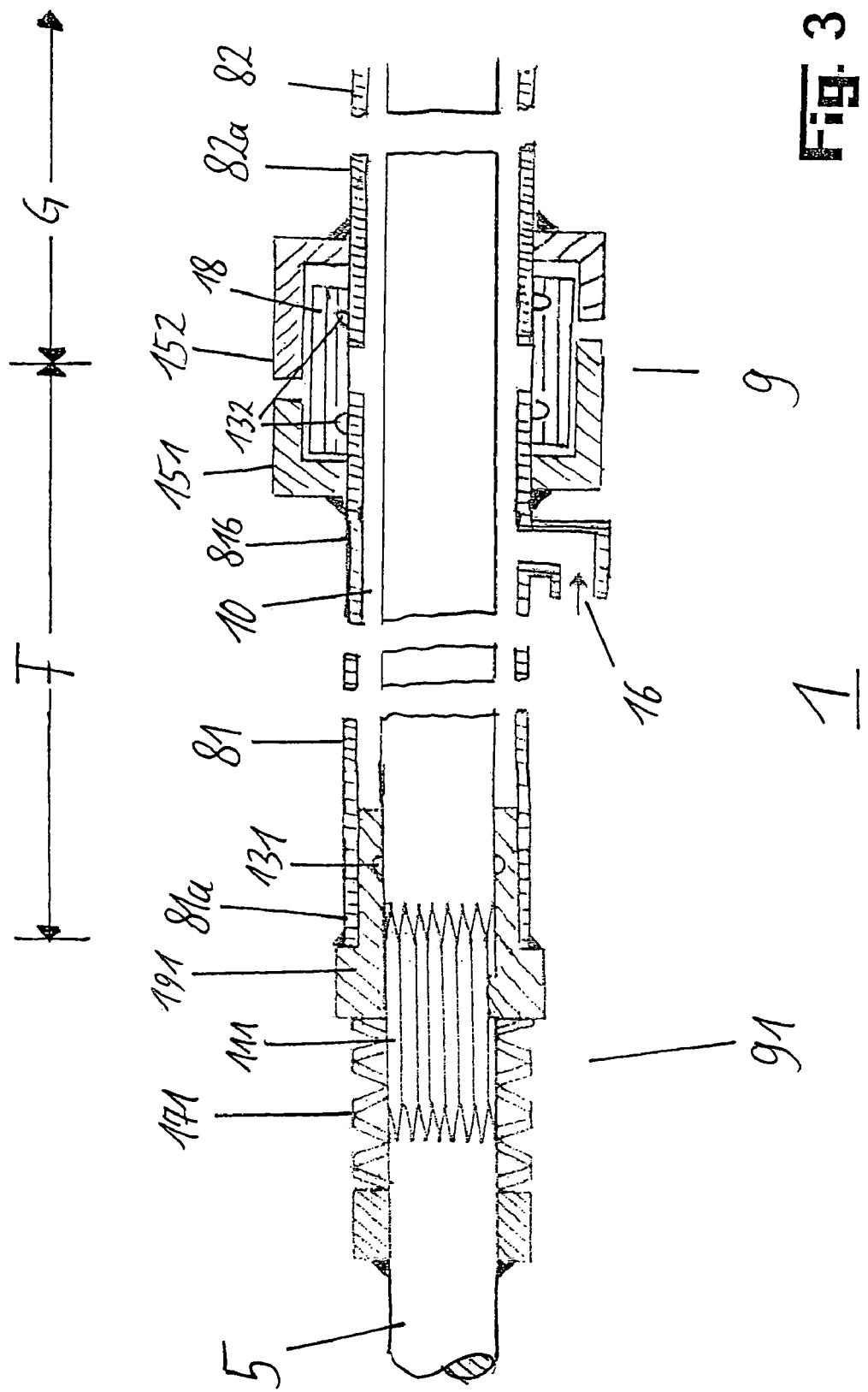
FIG. 3 is a cross-sectional view of the essential elements of the roll bar according to the present invention according to a second preferred embodiment.

FIG. 3 shows the essential elements of a second preferred embodiment of the roll bar 1 according to the present invention.

The second embodiment shown in FIG. 3 differs from the first embodiment shown in FIG. 2, in principle, in that the torsional stiffness of the unsplit torsion bar 5 of the roll bar 1 according to the present invention is essentially constant over its entire torsion area according to the second embodiment. Also, according to the second embodiment, the roll bar 1 according to the present invention has two torsion tubes 81, 82, which surround the unsplit torsion bar 5 in two adjacent partial areas F, G of its torsion area, wherein the ends of the torsion tubes 81, 82 that face away from each other are connected to mutually opposite areas of the unsplit torsion bar 5, rotating in unison therewith, and the ends of the torsion tube 81, 82 that face each other can be connected by means of a clutch arrangement 9 in such a way that they selectively rotate in unison.

The first and second torsion tubes 81, 82 are mounted in their ends facing away from each other in such a way that they rotate in unison and they are axially displaceable. Such an axially displaceable mounting is not absolutely necessary, but may be advantageous under certain conditions. Since the mounts 91, 92 of the ends of the first and second torsion tubes 81, 82, which face away from each other, correspond to each other according to the second embodiment, only the mount 91 of the first end 81a of the first torsion tube 81 is shown in FIG. 3.

The first torsion tube 81 is connected with its end 81a facing away from the second torsion tube 82 to a sliding element 191, rotating in unison therewith. The sliding element 191 engages longitudinal grooves 111, which are prepared in the torsion bar 5, and is thus nonrotatably displaceable in the longitudinal direction of the torsion bar 5. The sliding element 191 has a seal 131 for sealing against the torsion bar 5. The first torsion tube 81 is pretensioned via the sliding element 191 in the direction of the second torsion tube 82 by means of a spring arrangement 171, which preferably has plate springs.

The ends 81b, 82a of the torsion tubes 81, 82, which ends face each other, are arranged displaceably in a pressure-proof sleeve 18 such that an annular chamber 10 is formed by the first and second torsion tubes 81, 82 closed with a sliding element 191, the torsion bar 5 and the sleeve 18. The sleeve 18 has seals 132 for sealing the annular chamber 10 against the outer walls of the first and second torsion tubes 81, 82.

Furthermore, claws 151, 152, which can be caused to engage each other, are fastened at the ends 81b, 82a of the torsion tubes 81, 82, rotating in unison.

The annular chamber 10 is connected via an inlet opening 16 to a pressure source, not shown, in order to admit a pressurized hydraulic or pneumatic medium into the annular chamber 10. The forces of pressure of the medium are suitable for displacing the first and second torsion tubes 81, 82 with the claws 151, 152 attached thereto away from each other on demand, so that it is possible to uncouple the first torsion tube 81 from the second torsion tube 82.

Consequently, the torsional stiffness of the roll bar 1 according to the present invention according to the second embodiment is obtained in the coupled state as the sum of the torsional stiffnesses of the torsion bar 5 and the first and second torsion tubes 81, 82. It is especially advantageous here for the torsional stiffness of the torsion tubes 81, 82 connected for rotation in unison to be between 80% and 50% of the torsional stiffness of the roll bar.

In the uncoupled state, the torsional stiffness of the roll bar 1 according to the present invention is based, by contrast, on the torsional stiffness of the unsplit torsion bar 5.

The clutch arrangement 9, 9' is preferably controlled in the above-described embodiments hydraulically by means of a computer-controlled actuating unit, not shown. However, the control may also be performed pneumatically or via a motor operator.

The actuating unit has a motor-driven pump, e.g., a pump driven by an electric motor, whose suction side is or can be connected to a reservoir for a hydraulic medium and whose delivery side can be connected to a pressure storage unit via a delivery line as well as to a reservoir via a pressure limiting valve and to the clutch arrangement 9, 9' via a control valve.

If the control valve, designed, e.g., as a sliding valve, is actuated for opening the clutch arrangement 9, 9', the delivery line is connected to the inlet opening 16, 16' of the clutch arrangement 9, 9', i.e., the pressure of the pump is admitted to the clutch arrangement 9, 9' and it is correspondingly opened or kept open.

If the control valve is changed over into its other position, the connection between the delivery line and the inlet opening 16, 16' of the clutch arrangement 9, 9' is blocked and a connection is at the same time established between the inlet opening 16, 16' and the reservoir. The hydraulic pressure is correspondingly released from the clutch arrangement 9, 9', and the clutch arrangement 9, 9' is closed or kept closed by the spring force of the springs 171, 17'.

The control valve is preferably controlled by means of a computer, likewise not shown, which is connected on the input side with sensors for the particular steering angle as well as for the particular travel velocity and/or optionally to additional transducers for additional data, e.g., data on the angular velocity of the steering wheel, the lateral acceleration of the vehicle, properties of the tires or the state of loading of the vehicle. The computer can calculate the actual value and/or an expectable value of the lateral acceleration of the vehicle from the data obtained.

As soon as the actual and/or expectable lateral acceleration exceeds a threshold value which can be preset, the control valve is actuated for blocking the clutch arrangement 9, 9'. The partial section A' of the torsion bar 5' is thus coupled with the second end 8b' of the torsion tube 8' according to the above-described first embodiment, or the second end 81b of the first torsion tube 81 is coupled with the first end 82a of the second torsion tube 82 according to the above-described second embodiment, so that the torsional stiffness of the roll bar 1, 1' according to the present invention is maximally effective, and a different inward deflection and outward deflection of the opposite wheel suspensions 4, 4' of the vehicle wheels of the same axle 2, 2' of the vehicle, which said wheel suspensions are connected thereto, are maximally counteracted in an elastic manner.

During straight-line travel or when the computer determines low or negligible values of the lateral acceleration of the vehicle, the control valve is actuated for opening the clutch arrangement, so that the partial area A' of the torsion bar 5' and the second end 8b' of the torsion tube 8' according to the above-described first embodiment or the second end 81b of the first torsion tube 81 and the first end 82a of the second torsion tube 82 are uncoupled from one another according to the above-described second embodiment, and the roll bar 1, 1' according to the present invention acts for these values of the lateral acceleration of the vehicle only within the framework of the torsional stiffness of the respective unsplit torsion bar 5, 5', so that it elastically counteracts a relative movement of the wheel suspensions 4, 4' of the vehicle wheels of the same axle 2, 2' to a low extent only.

Another, especially preferred embodiment of the clutch arrangement 9, 9' will be described below on the basis of FIGS. 4, 5 and 6.

According to this especially preferred embodiment, the clutch arrangement 9, 9' is designed in the form of a carrier ball coupling. The carrier ball coupling has a first and second element 51 and 52, respectively, wherein the elements 51, 52 are displaceable in relation to one another, and pockets 531, 532 for carrier balls 54 are prepared on the sides of the elements 51, 52 that face one another.

Figure 4:
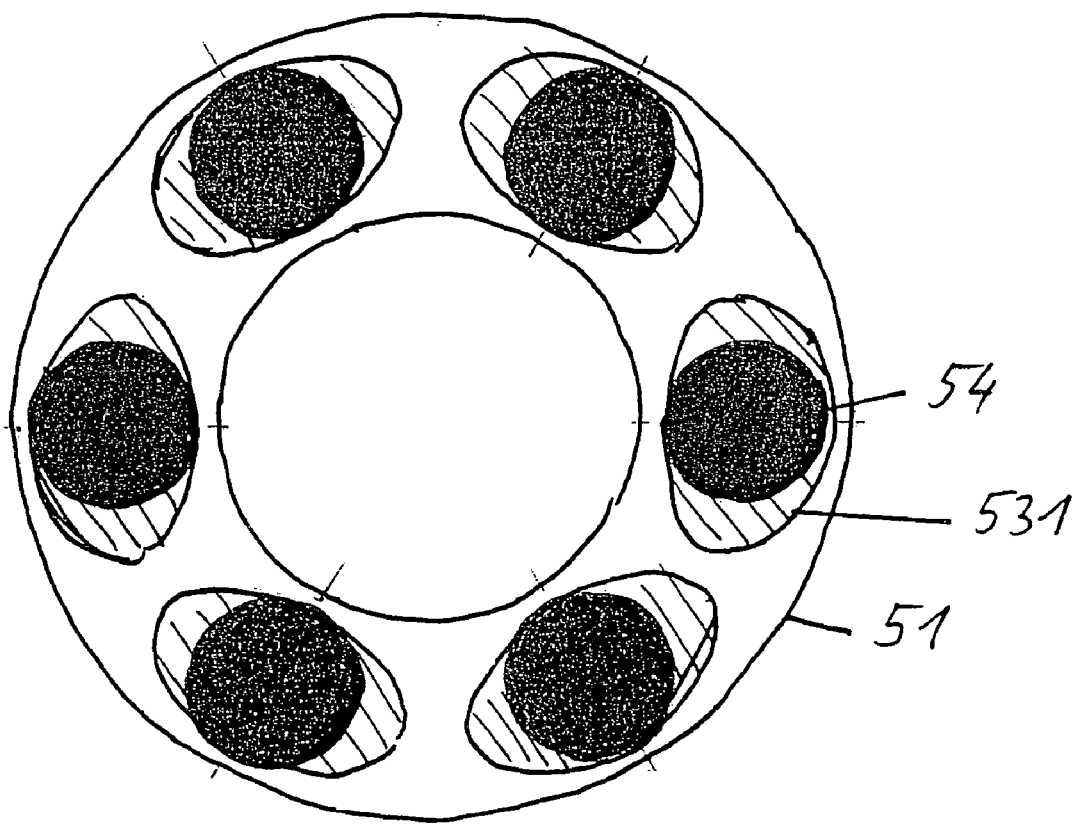
FIG. 4 is a top view of an essential component of a carrier ball coupling.

The top view of an element 51 with pockets 531 and carrier balls 54 is shown in FIG. 4. The second element 52, not shown in FIG. 4, preferably has the same design as the first element 51. As is shown in FIG. 4, the pockets 531 are preferably arranged on a circular ring and have an essentially elliptical circumferential line.

Figure 5:
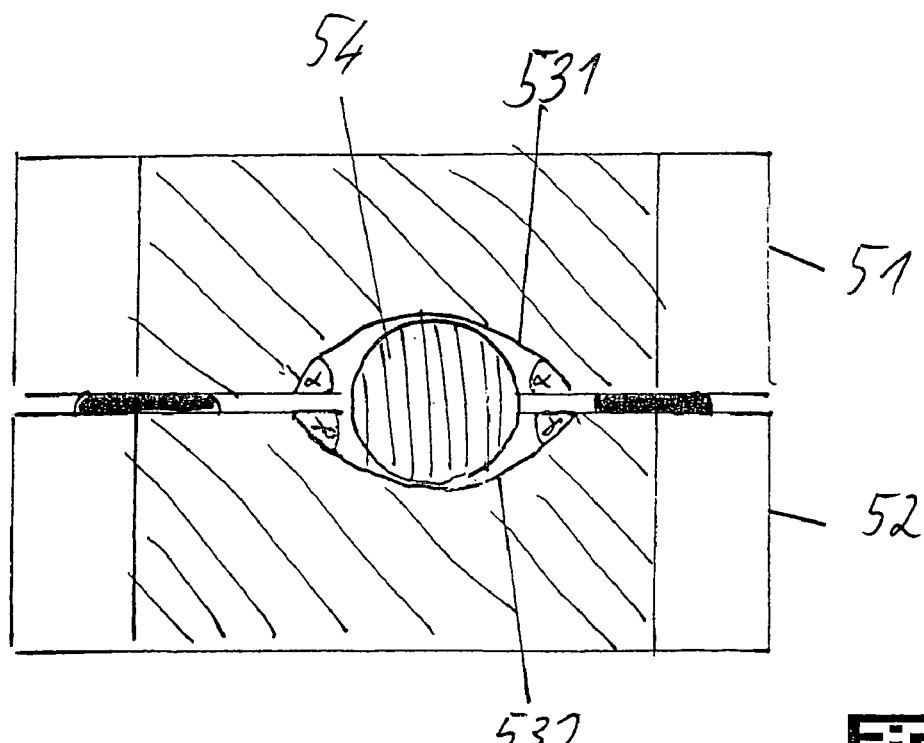
FIG. 5 is a cross-sectional view of a closed carrier ball coupling.
Figure 6:
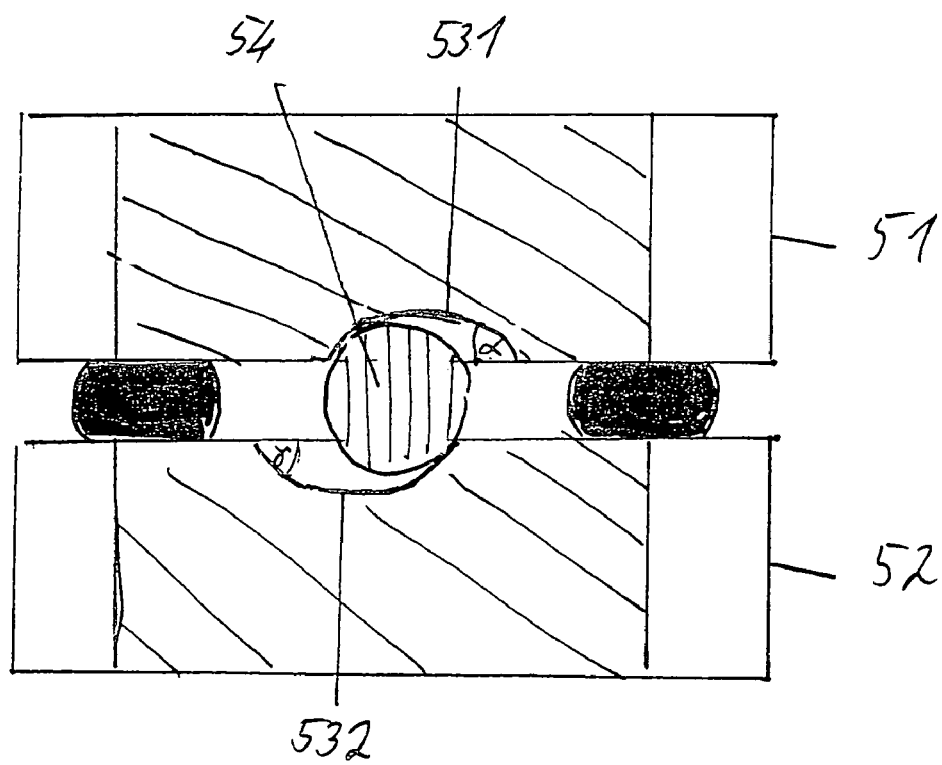
FIG. 6 is a cross-sectional view through an opened carrier ball coupling.

As is apparent from FIGS. 5 and 6, the first element 51 and the second element 52 are arranged such that the carrier balls 54 are arranged between the first element 51 and the second element 52.

As is apparent from FIGS. 5 and 6, the pockets 531 and 532 are each designed corresponding to the shape of a segment of an ellipsoid of revolution and have ramps in relation to the lateral surfaces of the two elements 51, 52, which said lateral surfaces face each other, the ramps forming an angle $\alpha$, $\gamma$ with the lateral surfaces of the elements 51 and 52. By suitably selecting the angles $\alpha$, $\gamma$, the ramps are designed in this preferred embodiment such that a permissible crossing of preferably 7° to 10° cannot be exceeded between the torsion bar 5' and the torsion tube 8' or between the two torsion tubes 81, 82 when the coupling is opened. The angles $\alpha$, $\gamma$ are preferably between 55° and 65° and preferably equal 60° for this.

The special advantage of the above-described carrier ball coupling is that it permits an exactly definable limitation [sic—possible typo for word meaning "crossing"—Tr.Ed.] between the torsion bar 5' and the torsion tube 8' or between the two torsion tubes 81, 82 in the opened state, and, as is apparent from, e.g., FIG. 6, it can also be reliably closed in the crossed state.

Thus, an inexpensive roll bar is proposed according to the present invention, which is always sufficiently active during travel in curves as well as during evading maneuvers and compromises the spring action characteristics of the vehicle to a low extent only, so that a high level of driving smoothness is guaranteed.

While specific embodiments of the invention have been shown and described in detail to illustrate the application of the principles of the invention, it will be understood that the invention may be embodied otherwise without departing from such principles.

The invention claimed is:

1. A roll bar for a motor vehicle having a vehicle chassis and two opposite wheel suspensions of a same axle, the roll bar comprising:
   an unsplit torsion bar rotatably fastened to the vehicle chassis and connected to the two opposite wheel suspensions of the same axle of the vehicle and having a torsion area for elastically coupling spring action movements of the two opposite wheel suspensions;
   a clutch arrangement;
   a first torsion tube surrounding said unsplit torsion bar at least in a first partial area of a torsion area of said unsplit torsion bar, said torsion tube having a first end connected to said unsplit torsion bar and rotating in unison therewith, and having a second end connectable by said clutch arrangement to said unsplit torsion bar, selectively rotating in unison therewith, so that the torsional stiffness of the roll bar can be varied; and
   a second torsion tube surrounding said torsion bar in a second partial area of the torsion area, said second torsion tube having a first end connected to said second end of said first torsion tube by said clutch arrangement to selectively rotate in unison therewith, and said second torsion tube having a second end connected to said unsplit torsion bar to rotate in unison therewith, wherein said first end of said first torsion tube and/or said second end of said second torsion tube is mounted on said torsion bar rotating in unison such that it can be axially displaced by said clutch arrangement.

2. A roll bar in accordance with claim 1, wherein said unsplit torsion bar has areas of different torsional stiffness and a torsional stiffness of said unsplit torsion bar is lower in said first partial area than in a second partial area.

3. A roll bar in accordance with claim 1, wherein a torsional stiffness of said unsplit torsion bar is between 20% and 50%, and a torsional stiffness of said torsion tube is between 80% and 50% of the torsional stiffness of said roll bar when said second end of said torsion tube is connected to said unsplit torsion bar by means of said clutch arrangement in such a way that it rotates in unison therewith.

4. A roll bar in accordance with claim 1, wherein said clutch arrangement connects said second end of said torsion tube to said torsion bar, rotating in unison therewith, as a function of the actual and/or expectable lateral acceleration of the vehicle.

5. A roll bar in accordance with claim 1, wherein a torsional stiffness of said first torsion tube and said second torsion tube connected for rotation in unison, is between 80% and 50% of the torsional stiffness of the roll bar when said second end of said first torsion tube is connected to said first end of said second torsion tube by said clutch arrangement in such a way that it rotates in unison therewith.

6. A roll bar in accordance with claim 1, wherein said clutch arrangement connects said second end of said first torsion tube to said first end of said second torsion tube, rotating in unison therewith, as a function of the actual and/or expectable lateral acceleration of the vehicle.

7. A roll bar in accordance with claim 1, wherein said first and/or second torsion tube centrically surrounds said unsplit torsion bar.

8. A roll bar in accordance with claim 1, wherein said clutch arrangement can be controlled as a function of the speed of travel and the steering angle and/or the angular velocity of the steering wheel and/or the lateral acceleration of the vehicle.

9. A roll bar in accordance with claim 1, wherein said clutch arrangement has spring assemblies for rapid closing of said clutch arrangement.

10. A roll bar in accordance with claim 1, wherein said clutch arrangement automatically closes or remains closed in case of a defect.

11. A roll bar in accordance with claim 1, wherein said clutch arrangement is switched hydraulically or pneumatically.

12. A roll bar in accordance with claim 1, wherein said clutch arrangement has an annular hydraulic cylinder for opening said clutch arrangement.

13. A roll bar in accordance with claim 1, wherein said clutch arrangement prevents a crossing or a transverse movement beyond said clutch arrangement between said torsion bar and said torsion tube or between two torsion tubes during straight-line travel of the vehicle.

14. A roll bar in accordance with claim 13, wherein a potential crossing or a transverse movement between said torsion bar and said torsion tube or between two torsion tubes is limited by means of end stops.

15. A roll bar in accordance with claim 1, wherein said clutch arrangement comprises a claw clutch.

16. A roll bar in accordance with claim 15, wherein said claw teeth of said claw clutch are provided such that a crossing or a transverse movement permissible between said torsion bar and said torsion tube or between torsion tubes during straight-line travel of the vehicle cannot be exceeded.

17. A roll bar in accordance with claim 15, wherein said claw teeth of said claw clutch are such that a spring force of a spring, which is suitable for closing said claw clutch, is amplified via the flanks of said teeth in order to guarantee the reliable closing of said claw clutch even in case of a crossing or a transverse movement between said torsion bar and said torsion tube or between two torsion tubes.

18. A roll bar in accordance with claim 1, wherein said clutch arrangement comprises a carrier ball coupling with a first element and a second element, wherein said first element and said second element are displaceable in relation to one another, and said pockets for said carrier balls are prepared in said sides of said elements, which said sides face one another, so that said carrier balls are arranged between said first element and said second element.

19. A roll bar in accordance with claim 18, wherein said pockets are arranged on a circular ring.

20. A roll bar in accordance with claim 18, wherein said pockets are designed corresponding to a segment of an ellipsoid of revolution.

21. A roll bar in accordance with claim 18, wherein said pockets have ramps, which are designed such that a permissible crossing or a transverse movement between said torsion bar and said torsion tube or between two torsion tubes cannot be exceeded when said carrier ball coupling is opened.

* * * * *